United States Patent [19]

Block et al.

[11] 4,246,103
[45] Jan. 20, 1981

[54] PROPANE-1,3-DIPHOSPHONIC ACIDS FOR CONDITIONING WATER

[75] Inventors: Hans-Dieter Block; Herbert Kallfass; Roland Kleinstück, all of Cologne, Fed. Rep. of Germany

[73] Assignee: Bayer Aktiengesellschaft, Leverkusen, Fed. Rep. of Germany

[21] Appl. No.: 15,999

[22] Filed: Feb. 28, 1979

Related U.S. Application Data

[63] Continuation of Ser. No. 790,353, Apr. 25, 1977, abandoned.

[30] Foreign Application Priority Data

May 14, 1976 [DE] Fed. Rep. of Germany ....... 2621606

[51] Int. Cl.³ ............................................. C02F 5/14
[52] U.S. Cl. .................................. 210/699; 252/180; 252/389 A; 422/15
[58] Field of Search .................. 21/2.7 A; 210/58, 59; 252/8.55 E, 180, 181, 389 A; 260/502.4 P; 422/15

[56] References Cited

U.S. PATENT DOCUMENTS

| | | |
|---|---|---|
| 3,297,578 | 1/1967 | Crutchfield et al. ................... 252/99 |
| 3,400,176 | 9/1968 | Quimby ......................... 260/502.4 P |
| 3,617,575 | 11/1971 | Quimby ......................... 260/502.4 P |
| 3,743,688 | 7/1973 | Nicholson et al. ................... 252/175 |
| 3,837,803 | 9/1974 | Carter et al. ....................... 21/2.7 A |
| 3,886,205 | 5/1975 | Geffers et al. ......................... 210/58 |
| 3,890,228 | 6/1975 | Hwa et al. ............................. 210/58 |
| 3,904,493 | 9/1975 | Losi et al. ...................... 260/502.4 P |
| 3,923,876 | 12/1975 | Heins et al. .................... 260/502.4 P |
| 4,026,815 | 5/1971 | Kallfass et al. ........................ 210/58 |
| 4,052,160 | 10/1977 | Cook et al. .......................... 21/2.7 A |
| 4,057,511 | 11/1977 | Bohnsack et al. ................... 21/2.7 A |

Primary Examiner—Peter A. Hruskoci
Attorney, Agent, or Firm—Sprung, Felfe, Horn, Lynch & Kramer

[57] ABSTRACT

Water is conditioned by adding thereto a corrosion-inhibiting, concretion inhibiting, precipitation retarding, deflocculating, dispersing or fluidifying amount of an acid of the formula

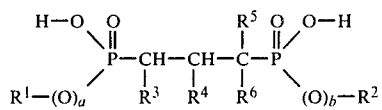

in which $R^1$ and $R^2$, independently of one another, represent hydrogen where a or $b=1$, or where a or $b=0$ represent an optionally substituted alkyl radical with 1-8 carbon atoms or an optionally substituted phenyl radical, $R^3$ represents hydrogen, an optionally substituted alkyl radical with 1 to 4 carbon atoms, an optionally substituted phenyl radical, a halogen atom from the group comprising fluorine, chlorine and bromine, a hydroxyl group, an alkoxy group containing 1 to 8 carbon atoms, a carboxyl group or a group $—P(O)—(O)_a—R^1 OH$, $R^4$ represents hydrogen, an alkyl radical with 1 to 4 carbon atoms, an alkenyl radical with up to 3 carbon atoms, an optionally substituted phenyl radical, a carboxyl group, a fluorine or chlorine atom or a group $—P(O)—(O)_a—R^1 OH$, or $R^3$ and $R^4$ together form a ring bridge with 3 to 5 methylene groups, $R^5$ represents hydrogen, an optionally substituted alkyl radical with 1 to 4 carbon atoms, a carboxymethyl or carboxyethyl group optionally substituted by a methyl group, a succinyl group or a group having the structure $—CHR^4—CHR^3—P(O)—(O)_a—R^1$ OH or the structure $—CH_2—P(O)—(O)_a—R^1 OH$, $R^6$ represents an optionally substituted phenyl radical, a carboxyl group or a group having the structure $—P(O)—(O)_b—R^2 OH$, and a and b independently of one another represent the numbers 0 or 1, or a salt thereof.

3 Claims, No Drawings

PROPANE-1,3-DIPHOSPHONIC ACIDS FOR CONDITIONING WATER

This is a continuation of application Ser. No. 790,353, filed 4/25/77, abandoned.

This invention relates to the use of the 1-substituted propane-1,3-diphosphonic acids and phosphinic acids defined hereinafter and their salts for conditioning aqueous solutions and suspensions, especially industrial water and aqueous sludges.

In aqueous systems, the 1-substituted propane-1,3-diphosphonic acids and phosphinic acids act as corrosion inhibitors, concretion inhibitors, precipitation retarders, deflocculants, dispersants and fluidifiers.

The 1-substituted propane-1,3-diphosphonic acids and phosphinic acids used in accordance with the invention correspond to the general formula (I):

$$\begin{array}{c} H-O \quad O \quad\quad\quad R^5 \quad O \quad O-H \\ \diagdown \| \quad | \quad\quad\quad | \quad \| \diagup \\ P-CH-CH-C-P \\ \diagup \quad | \quad | \quad | \quad \diagdown \\ R^1-(O)_a \quad R^3 \quad R^4 \quad R^6 \quad (O)_b-R^2 \end{array} \quad (I)$$

in which
- $R^1$ and $R^2$ independently of one another represent hydrogen where a or b=1, or where a or b=0 represent an optionally substituted alkyl radical with 1 to 8 carbon atoms or an optionally substituted phenyl radical,
- $R^3$ represents hydrogen, an optionally substituted alkyl radical with 1 to 4 carbon atoms, an optionally substituted phenyl radical, a halogen atom from the group comprising fluorine, chlorine and bromine, a hydroxyl group, an alkoxy group containing 1 to 8 carbon atoms, a carboxyl group or a group of the formula: $-P(O)-(O)_a-R^1$ OH,
- $R^4$ represents hydrogen, an alkyl radical with 1 to 4 carbon atoms, an alkenyl radical with up to 3 carbon atoms, an optionally substituted phenyl radical, a carboxyl group, a fluorine or chlorine atom, or a group of the formula: $-P(O)-(O)_a-R^1$ OH, or
- $R^3$ and $R^4$ together form a ring bridge with 3 to 5 methylene groups,
- $R^5$ represents hydrogen, an optionally substituted alkyl radical with 1 to 4 carbon atoms, a carboxymethyl or carboxyethyl group optionally substituted by a methyl group, a succinyl group or a group having the structure $CHR^4-CHR^3-P(O)-(O)_a-R^1$ OH or the structure: $CH_2-P(O)-(O)_a-R^1$ OH,
- $R^6$ represents an optionally substituted phenyl radical, a carboxyl group or a group having the structure: $-P(O)-(O)_b-R^2$ OH, and
- a and b independently of one another represent the numbers 0 or 1.

$R^4$ and $R^3$ preferably represent hydrogen.

Accordingly, the substituent $R^6$ in the 1-position characterizing the propane-1,3-diphosphonic acids and phosphinic acids used in accordance with the invention is always a so-called activating electron-attracting substituent.

The salts of the above-described acids are formed by partially or completely replacing each of the acid hydrogen atoms by one equivalent of a monovalent or polyvalent cation such as, for example, a metal, preferably an alkali metal, ammonium, phosphonium, guanidinium, hydrazinium or hydroxyl ammonium.

The process for producing the above-described substituted propane-1,3-diphosphonic acids and phosphinic acids used in accordance with the invention and their salts is based on the optionally acid- or alkaline-catalyzed hydrolysis of their organic derivatives, preferably their esters, their amides, their carboxylic acid nitriles or their anhydrides, optionally followed by partial or complete neutralization with bases, for example metal hydroxides, metal oxides, metal carbonates, metal salts of weak acids having $pk_s$-values of greater than 2, with amines, hydrazines, quaternary ammonium hydroxides or other monovalent or polyvalent aliphatic or aromatic, open-chain or cyclic, saturated or unsaturated optionally substituted nitrogen-containing bases or their salts with weak acids.

The following are examples of the substituted propane-1,3-diphosphonic acids and phosphinic acids used in accordance with the invention:

1-carboxy-propane-1,3-diphosphonic acid
1-carboxy-2-methyl-propane-1,3-diphosphonic acid
1-carboxypropane-1,1,3-triphosphonic acid
1-carboxy-1-phosphonopropyl-3-methylphosphinic acid
1-carboxy-1-phosphonopropyl-3-phenylphosphinic acid
1-carboxybutane-1,3-diphosphonic acid
1-carboxy-2,2-dimethylpropane-1,3-diphosphonic acid
1-carboxy-1-methylphosphinopropane-3-phosphonic acid
1-carboxy-2-methyl-butane-1,3-diphosphonic acid
1-carboxy-3-phenylpropane-1,3-diphosphonic acid
1-carboxy-3-chloropropane-1,3-diphosphonic acid
1-carboxy-3-bromopropane-1,3-diphosphonic acid
1-carboxy-3-methoxypropane-1,3-diphosphonic acid
1-carboxy-3-hydroxypropane-1,3-diphosphonic acid
1,3-dicarboxypropane-1,3-diphosphonic acid
1,2-dicarboxypropane-1,3-diphosphonic acid
1-phenylpropane-1,3-diphosphonic acid
1-phenylbutane-1,3-diphosphonic acid
propane-1,1,3-triphosphonic acid
butane-1,1,3-triphosphonic acid
2-methylpropane-1,1,3-triphosphonic acid
3-chloropropane-1,1,3-triphosphonic acid
1-(β-phosphonoethyl)-propane-1,1,3-triphosphonic acid
1-(β-carboxyethyl)-propane-1,1,3-triphosphonic acid
1-(β-carboxypropyl)-propane-1,3-triphosphonic acid
1-(β-carboxyethyl)-propane-1,1,3,3-tetraphosphonic acid
1-(β-phosphonoethyl)-1-carboxypropane-1,3-diphosphonic acid
1-(β-carboxyethyl)-1-carboxypropane-1,3-diphosphonic acid
1-(β-carboxypropyl)-1-carboxypropane-1,3-diphosphonic acid
1-(β-carboxypropyl)-1-carboxypropane-1,3-diphosphonic acid
1-carboxymethyl-1-carboxypropane-1,3-diphosphonic acid
1-carboxymethyl-1-carboxypropane-1,3,3-triphosphonic acid
1-carboxymethyl-1-carboxy-1-phosphonopropane-3-methyl phosphinic acid
1-carboxymethyl-1-carboxy-1-phosphonopropane-3-phenylphosphinic acid 1-carboxymethyl-1-carboxybutane-1,3-diphosphonic acid
1-carboxymethyl-1-carboxy-2-methylpropane-1,3-diphosphonic acid
1-carboxymethylpropane-1,1,3-triphosphonic acid
1-carboxymethyl-1-carboxy-2,2-dimethylpropane-1,3-diphosphonic acid
1-carboxymethyl-1-carboxy-3-phosphono-1-methyl-phosphinic acid
1-carboxymethyl-1-carboxy-2-methylbutane-1,3-diphosphonic acid
1-carboxymethyl-1-carboxy-3-phenylpropane-1,3-diphosphonic acid
1-carboxymethyl-1-carboxy-3-chloropropane-1,3-diphosphonic acid
1-carboxymethyl-1-carboxy-3-bromopropane-1,3-diphosphonic acid
1-carboxymethyl-1-carboxy-3methoxpropane-1,3-diphosphonic acid
1-carboxymethyl-1-carboxy-3-hydroxypropane-1,3-diphosphonic acid
1-carboxymethyl-1,3-dicarboxypropane-1,3-diphosphonic acid
1-carboxymethyl-1,2-dicarboxypropane-1,3-diphosphonic acid Further examples of the 1-substituted propane-1,3-diphosphonic acids used in accordance with the invention may be derived from the associated organic derivatives referred to hereinafter, more especially from the esters, whose hydrolysis results in the formation of the 1-substituted propane-1,3-diphosphonic acids and phosphinic acids.

Examples of the organic derivatives whose hydrolysis results in the formation of the 1-substituted propane-1,3-diphosphonic acids used in accordance with the invention are the alkyl esters of the above-mentioned acids, more especially their methyl esters, which may in turn be produced by the addition reaction of C-H-acid phosphonic acid and phosphinic acid esters or amides with substituted or unsubstituted vinyl phosphonic acid and vinyl phosphinic acid esters and amides. All the 1-substituted propane-1,3-diphosphonic acids used in accordance with the invention are obtained by combining the vinyl phosphonic acid and vinyl phosphinic acid derivatives with the C-H-acid phosphonic acid and phosphinic acid derivatives by addition. The addition reaction may, in general, be initiated and completed by the addition of alkali.

It follows from this synthesis principle that the activating and acidifying substituent introduced into the reaction product with the C-H-acid phosphonic acid or phosphinic acid derivative gives the characteristic substituent $R^6$ in the 1-substituted propane-1,3-phosphonic acids, either as such or after hydrolysis. Substituted and unsubstituted vinyl phosphonic acid and vinyl phosphinic acid derivatives suitable for the addition of C-H-acid phosphonic acid and phosphinic acid derivatives are known in large numbers or may be obtained by known methods.

Processes by which they are produced in a large number of cases are based on the following methods (a) to (i):

a. the elimination of hydrogen halide from the corresponding 2-halogen alkyl phosphonyl compounds (for example Russian Pat. No. 395,533; S. Inokowa, T. Gomyo, H. Yoshida, T. Ogato, Synthesis 1973, 364; Y. Okamoto, T. Kawai, H. Sakurai, Bull. Chem. Soc. Japan 47, 2903 (1974); M. I. Kabachnik et al., Petroleum Chem. 3, 416 (1963); N. P. Nesterova, Izvest. Akad. Nauk. SSSR, Ser.Khim. 1974, pp. 2295–2300), b. the reaction of the vinyl (thio) phosphonic acid and vinyl (thio) phosphinic acid chlorides with alcohols or alkylene oxides or amines, or on the esterification of the free acids with alkylene oxides, with relatively high boiling alcohols, with orthocarbonic acid esters or orthocarboxylic acid esters or with trialkyl phosphites (for example German DAS No. 1,300,296), c. the elimination of water from α-hydroxyalkyl phosphonyl compounds (German DAS No. 1,159,443; S. Inokawa et al., Synthesis 1973, pp. 364–365), d. the addition reaction of dialkyl phosphites and alkyl phosphonites with alkines (U.S. Pat. No. 3,673,285; A. N. Pudovik et al., Zh. Obshch. Khim. 31, 2656–2661 (1961); U.S. Pat. No. 3,093,672), e. the reaction of α-oxophosphonyl compounds with ketenes or with acyl chlorides or the elimination of alcohol from their ketals (German DOS No. 2,222,489; R. L. McConnell, H. W. Coover, J. Org. Chem. 23, 830 (1958), f. the reaction of trialkyl phosphites or dialkyl alkyl phosphonites with vinyl halides (A. N. Pudovik, Zh. Obshch. Khim. 43, 1647–1648, (1973); P. Tavs, H. Weitkamp, Tetrahedron 26, 5529–5534 (1970); M. L. Honig, D. J. Martin, Phosphorus 4, 63–64 (1974), g. the base-catalyzed rearrangement of allyl phosphonyl and 2,3-epoxy propyl phosphonyl compounds (A. P. Rakov et al., Zh. Obshch. Khim. 45, 241 et seq (1975); D. J. Collins et al., Aust. J. Chem. 27, 2365et seq, (1974), h. the addition reaction of C-H-acid compounds with alkine phosphonates (A. N. Pudovik et al, Zh. Obshch. Khim. 36, 69–73, (1966), i. the thermal splitting of esters of 2-hydroxyalkyl phosphonyl compounds (L. Maier, Phosphorus 3, 19–25 (1973); Y. Okamoto et al., Bull. Chem. Soc. Japan 47, 2903–2904 (1974).

The vinyl phosphonyl compounds produced by the above-mentioned processes and similar processes are suitable for reaction with C-H-acid phosphonic acid and phosphinic acid derivatives to form organic derivatives of the 1-substituted propane-1,3-diphosphonic acids and phosphinic acids used in accordance with the invention.

The following are mentioned as examples of vinyl phosphonyl compounds of the kind in question:
vinyl phosphonic acid dimethyl ester
vinyl phosphonic acid diethyl ester
vinyl phosphonic acid di-n-propyl ester
vinyl phosphonic acid di-cyclohexyl ester
vinyl phosphonic acid di-2-ethylhexyl ester
vinyl phosphonic acid bis-2-chloroethyl ester
vinyl phosphonic acid-bis-2-hydroxy ethyl ester
vinyl phosphonic acid-bis-(2,2,3,3,4,4,4-heptafluorobutyl ester)
vinyl phosphonic acid glycol ester
vinyl phosphonic acid-1,2-propylene glycol ester
vinyl phosphonic acid-1,3-propylene glycol ester
vinyl phosphonic acid-1,4-butane diol ester
vinyl thiophosphonic acid dimethyl ester
vinyl thiophosphonic acid diethyl ester
vinyl thiophosphonic acid dibutyl ester
vinyl methyl phosphinic acid ethyl ester
vinyl methyl phosphinic acid methyl ester
vinyl phenyl phosphinic acid ethyl ester
vinyl phenyl phosphinic acid-i-propyl ester
isopropylene phosphonic acid dimethyl ester
isopropylene phosphonic acid diethyl ester
isopropylene phosphonic acid di-n-butyl ester propylene-1-phosphonic acid diethyl ester
propylene-1-phosphonic acid dimethyl ester
propylene-1-phosphonic acid glycol ester
butenyl-1-phosphonic acid diethyl ester
2,2-dimethyl vinyl phosphonic acid diethyl ester
2,2-dimethyl vinyl thiophosphonic acid diethyl ester
1,2-dimethyl vinyl phosphonic acid diethyl ester
1-ethyl vinyl phosphonic acid dimethyl ester
heptenyl-1-phosphonic acid dimethyl ester
heptenyl-1-thiophosphonic acid diethyl ester
heptenyl ethyl thiophosphinic acid ethyl ester
1-phenyl vinyl phosphonic acid diethyl ester
2-phenyl vinyl phosphonic acid diethyl ester
2-phenyl vinyl phosphonic acid dimethyl ester
cyclopentene phosphonic acid diethyl ester
cyclohexene phosphonic acid diethyl ester
1-chlorovinyl phosphonic acid dimethyl ester
1-chlorovinyl phosphonic acid diethyl ester
1-bromovinyl phosphonic acid diethyl ester
1-methoxy vinyl phosphonic acid dimethyl ester
1-ethoxy vinyl phosphonic acid diethyl ester
1-acetoxy vinyl phosphonic acid diethyl ester
1-cyanovinyl phosphonic acid diethyl ester
1-cyano-2-phenyl vinyl phosphonic acid diethyl ester
1-cyano-2-i-propyl vinyl phosphonic acid diethyl ester
2-cyanovinyl phosphonic acid diethyl ester
1-chlorovinyl ethyl phosphinic acid methyl ester
1-bromovinyl ethyl phosphinic acid ethyl ester
2-carbomethoxy vinyl phosphonic acid diethyl ester
ethylene-1,1-diphosphonic acid tetramethyl ester
ethylene-1,1-diphosphonic acid tetraethyl ester
ethylene-1,2-diphosphonic acid tetramethyl ester
ethylene-1,2-diphosphonic acid tetraethyl ester
1,2-dimethylethylene-1,2-diphosphonic acid tetramethyl ester
2,3-butadiene diphosphonic acid tetramethyl ester
2,3-butadiene diphosphonic acid tetraethyl ester
1,1,4,4-tetramethyl-2,3-butadiene diphosphonic acid tetraethyl ester
1,3-butadiene phosphonic acid diethyl ester
divinyl phosphinic acid ethyl ester
isoprene-1-phosphonic acid diethyl ester
ethylene glycol-bis(vinyl phenyl phosphinic acid ester)
condensates of vinyl phosphonic acid-bis-2-chloroethyl ester and alkyl phosphonates, e.g. methane phosphonic acid dimethyl ester.

The C-H acids, i.e. activated phosphonic acid and phosphinic acid derivatives, which are suitable for addition with the above-mentioned vinyl phophonic acid and vinyl phosphinic acid derivatives and, in this way, form the starting materials for the 1-substituted propane-1,3-diphosphonic acids and phosphinic acids used in accordance with the invention are also known or may be obtained by known methods.

They may be obtained, for example, by the following known methods:

a. By the so-called Michaelis-Arbusov reaction, i.e. by reacting halogen carboxylic acid alkyl esters, especially halogen acetic acid alkyl esters (halogen acetic acid amides), halogen acetonitrile, benzyl halides, halogen methyl ketones and halogen methyl phosphonyl compounds, with phosphorous acid trialkyl esters, phosphonous acid dialkyl esters or phosphinic acid alkyl esters, with the elimination of the corresponding alkyl halides (Houben-Weyl, Methoden der Organischen Chemie, Vol. XII, 1, pages 150-151, 252-256, 440, 444-445, 490-495).

b. By the so-called Michaelis-Becker reaction, i.e. by reacting halogen carboxylic acid alkyl esters, especially halogen acetic acid alkyl esters (halogen acetic acid amides), halogen acetonitrile, benzyl halides, halogen methyl ketones and halogen methyl phosphonyl compounds, with metal salts of dialkyl phosphites, alkyl phosphonites and secondary phosphine oxides, more especially with their alkali metal salts or their Grignard compounds, with the elimination of the corresponding metal halides (Houben-Weyl, Methoden der Organischen Chemie, Vol. XII, 1, pages 152-153, 254-257, 280, 446-453, 570).

c. By the alkylation of C-H-acid activated phosphonic acid and phosphinic acid derivatives of the type obtained by the methods described under (a) and (b), which contain two hydrogen atoms on the carbon atom situated between the phosphonyl group and the other activating group, with alkyl-halogen compounds, for example alkyl halides or halogen carboxylic acid esters and salts, or with activated unsaturated systems, for example acrylic acid derivatives or fumaric acid and maleic acid derivatives (German DOS No. 2,333,151) or styrene derivatives, in the presence of catalytic or substantially stoichiometric quantities of alkali, or after preceding metallization, or by their acylation with carboxylic acid chlorides in the presence of alkali or by halogenation, the C-H-acid activated phosphonyl compounds being reacted with at most molar quantities of the alkylating, acylating or halogenating agents (Houben-Weyl, Methoden der Organischen Chemie, Vol. XII, 1, pages 502, 512-517, 522).

The following are mentioned as examples:
dimethyl phosphonoacetic acid methyl ester
diethyl phosphonoacetic acid methyl ester
diethyl phosphonoacetic acid ethyl ester
di-i-butyl phosphonoacetic acid ethyl ester
ethyl ethoxy phosphonylacetic acid ethyl ester
methyl methoxy phosphonylacetic acid ethyl ester
1-carbomethoxy ethane-1-phosphonic acid diethyl ester
cyanomethane phosphonic acid dimethyl ester
cyanomethane phosphonic acid diethyl ester
cyanomethyl methyl phosphinic acid ethyl ester
phenyl methane phosphonic acid dimethyl ester
phenyl methane phosphonic acid diethyl ester
methane diphosphonic acid tetramethyl ester
methane diphosphonic acid tetraethyl ester
2-carbomethoxy ethane-1,1-diphosphonic acid tetraethyl ester
2-oxo-3-phenyl propane phosphonic acid dimethyl ester
2-oxo-2-phenyl ethane phosphonic acid dimethyl ester
2-oxo-3-(p-methoxyphenyl)-propane phosphonic acid dimethyl ester
2-oxopropane phosphonic acid diethyl ester
2-oxopropane phosphonic acid dimethyl ester
2-oxoheptane phosphonic acid diethyl ester
2-phosphonosuccinic acid tetramethyl ester
the monosodium salt of 2-phosphonosuccinic acid methyl ester
1-phosphonopropane-1,3-dicarboxylic acid tetramethyl ester
1-phosphonopropane-1,3-dicarboxylic acid tetraethyl ester
1-phosphonopropane-1,2,3-tricarboxylic acid pentamethyl ester
1,1-diphosphonopropane-2,3-dicarboxylic acid hexamethyl ester.

The vihyl phosphonyl derivatives, i.e. the vinyl phosphonic acid esters, the vinyl phosphinic acid esters or the corresponding amides, are reacted with the C-H-acid activated phosphonyl compounds, i.e. the phosphonic acid and phosphinic acid esters and amides, preferably in substantially stoichiometric ratios, i.e. in a molar ratio of approximately 1:1 or, if the C-H-acid phosphonyl compound to be reacted contains more than one acid hydrogen atom, if desired even in a molar ratio of vinyl phosphonyl compound to C-H-acid phosphonyl compound of approximately 2:1. If one of the components is used in excess, it may be recovered, for example by distillation or extraction.

Organic derivatives of the 1-substituted propane-1,3-diphosphonic acids and phosphinic acids of formula (I) are also obtained by reacting those organic derivatives of the 1-substituted propane-1,3-diphosphonic acids of formula (I) in which $R^5$ represents hydrogen, with derivatives of $\alpha,\beta$-unsaturated carboxylic acids, for example esters of acrylic acid, methacrylic acid, crotonic acid, or with derivatives, preferably esters, of maleic acid and fumaric acid or with styrene derivatives or with vinyl phosphonyl compounds of the kind described above, the reactions generally being catalyzed by alkali or other sufficiently strong bases. Organic derivatives of 1-substituted propane-1,3-diphosphonic acids and phosphinic acids of formula (I) are also formed from the above mentioned derivatives of the 1-substituted propane-1,3-diphosphonic acids of formula (I), in which $R^5$ represents hydrogen, by alkylation, for example after preceding metallisation or in the presence of alkali, with alkyl halogen compounds or with halogen carboxylic acid esters or even by their acylation with carboxylic acid chlorides in the presence of alkali or by halogenation.

In cases where the activated phosphonyl compound contains an active methylene group, it is also possible to mix the particular vinyl phosphonyl compound to be reacted with the other already mentioned, unsaturated compounds capable of addition, for example acrylic acid, maleic acid, methacrylic acid, crotonic acid or styrene derivatives, or with other substances from the class of the vinyl phosphonyl compounds and to use the resulting mixtures for the addition reaction instead of the pure vinyl phosphonyl compounds. In general, this process only gives mixtures of substances, in which the derivatives of the 1-substituted propane-1,3-diphosphonic acids and phosphinic acids nevertheless always form a significant part.

Strong bases are used as the catalysts for the reaction of the vinyl phosphonyl compounds with the activated phosphonyl compounds. Suitable strong bases are metal alcoholates, especially sodium alcoholates, metal hydrides, preferably alkali metal hydrides, and also alkali metal amides and organometallic compounds, especially of lithium, sodium and magnesium, as well as quaternary ammonium hydroxides, for example in the form of basic ion exchangers and also concentrated aqueous or alcoholic alkalis.

The reactions of organic derivatives of 1-substituted propane-1,3-diphosphonic acids and phosphinic acids, in which $R^5$ represents hydrogen, described in the preceding paragraph also require alkaline catalysis, for which purpose the above-mentioned strong bases are also suitable.

The alkaline catalysts are added to the reaction mixture in a quantity of about 0.1 to 100 mole % and preferably in a quantity of about 1 to 30 mole %, based on the vinyl phosphonyl compound to be reacted.

The addition reactions of the C-H-acid phosphonic acid and phosphinic acid derivatives with the vinyl phosphonyl compounds may be carried out either in the absence or in the presence of a diluent which is inert under the reaction conditions. Suitable diluents are any solvents in which the reactants to be used and the catalyst are at least partially soluble, which do not react with the strong bases used as catalysts to form catalytically inactive products, for example in acid-base reactions or in redox reactions, and which in addition do not react either on their own or with the starting materials or with the reaction products, the organic derivatives of the 1-substituted propane-1,3-diphosphonic acids, even in the presence of the above-mentioned catalysts, to form undesirable secondary products. Suitable solvents are inter alia aromatic hydrocarbons, ethers and alcohols. In cases where alcohols are used as solvent for the reactants and/or for the catalyst, it is important to ensure that the alkoxy radical of the alcohol used can be exchanged with the alkoxy or amido groups of the vinyl phosphonyl compound used and the C-H-acid phosphonic acid or phosphinic acid derivatives. If such an exchange is undesirable and troublesome in individual cases, only the alcohols corresponding to the alkoxy groups already present in the starting materials should be used, or the quantity of the alcohol added should be kept as small as possible.

The reaction temperatures in the above-described addition and alkylation stages of the process are in the range of from about 0° C. to about 150° C. and preferably in the range of about 10° C. to 60° C.

The addition of the vinyl phosphonyl compound with the C-H-acid phosphonyl compound is not confined to a certain pressure and may be carried out both at subatmospheric pressure and also at super-atmospheric pressure, although it is preferably carried out at atmospheric pressure.

The reactants may be combined either (a) by initially introducing the vinyl phosphonyl compound and the activated C-H-acid phosphonyl compound together, followed by introduction of the catalyst, or (b) by initially introducing the activated phosphonyl compound with or without the catalyst and then adding the vinyl phosphonyl compound with or without the catalyst, or (c) by simultaneously adding the vinyl phosphonyl compound and the activated phosphonyl compound to the catalyst. If, by contrast, the vinyl phosphonyl compound is initially introduced, a not inconsiderable quantity of polymers of the vinyl phosphonyl compound can be expected to be found when the alkaline catalyst is added. Accordingly, this procedure is less suitable for the production of pure organic derivatives of 1-substituted propane-1,3-diphosphonic acids and phosphinic acids.

As already mentioned, in cases where the activated phosphonyl compound contains an active methylene group, it is also possible to mix the particular vinyl phosphonyl compound to be reacted with the other above-mentioned unsaturated compounds capable of addition, for example acrylic acid derivatives or other vinyl phosphonyl compounds and to use the resulting mixtures for the addition reaction instead of the pure vinyl phosphonyl compounds.

The products formed by the addition of the C-H-acid phosphonyl compound with the vinyl phosphonyl compound are formed in an adequate state of purity, so they do not have to be separated off from the reaction mixture by complete distillation. In general, the above-mentioned products are present in sufficiently high purity following the removal of volatile constituents by distillation in vacuo.

The partial or complete hydrolysis of the organic derivatives of the 1-substituted propane-1,3-diphosphonic acids and phosphinic acids thus produced may be carried out both in anhydrous medium, for example by reaction with dry hydrogen chloride at temperatures of from about 130° to about 180° C. and also in aqueous solution in the presence or absence of acid or alkaline catalysts. Acid catalysts, for example mineral acids or acidic ion exchangers, may be used in substoichiometric to over-stoichiometric quantities. In cases where hydrogen halides are used, a more or less large part of the alkyl radicals split off is obtained in the form of alkyl halide and not alcohol. Accordingly, the acid active as catalyst is consumed. In the absence of catalysts, relatively high temperatures, preferably above 120° C., are required for hydrolysis. By distilling off the water and the hydrogen halide added, if any, and by filtering off solid catalysts, the partly or completely hydrolyzed products, i.e. the 1-substituted propane-1,3-diphosphonic acids and phosphinic acids of the general formula (I), are obtained in the requisite form and substantially free from water.

Alkaline hydrolysis catalysts, preferably alkali metal hydroxides, are preferably used in substantially stoichiometric quantities. In this case, the hydrolysis products are the corresponding metal salts of the acids liberated during hydrolysis.

Hydrolysis results in the partial or complete conversion of the groups present in the reaction products of the vinyl phosphonyl compounds and the C-H-acid phosphonyl compound. In addition to the conversions, falling under the definition of "hydrolysis" in its narrower sense, of the carboxylic acid, phosphonic acid and phosphinic acid esters and amides into carboxylic acids, phosphonic acids and phosphinic acids, conversions of nitrile groups into carboxyl groups, of thiophosphonyl groups into phosphonyl groups and of acyloxy groups into hydroxy groups also occur.

Unless conversion into salts has already occurred during alkaline hydrolysis of the associated organic derivatives, the 1-substituted propane-1,3-diphosphonic acids and phosphinic acids are converted into their salts by the addition of bases in substoichiometric or stoichiometric or overstoichiometric quantities. It is possible in this way partly or completely to neutralize the different acid groups in stages or even to use an excess of base.

The propane-1,3-diphosphonic acids and phosphinic acids may be reacted to form their salts both by combination with the base itself, with its solutions, suspensions or emulsions, preferably in water or a water-miscible solvent or an auxiliary substance to be added to the mixture, and also with mixtures of different bases and also in stages successively with different bases.

Examples of bases suitable for partial or complete neutralization or for alkylization over and above neutralization are metal hydroxides (inter alia sodium, potassium, calcium, zinc and aluminum hydroxide), metal oxides (inter alia calcium, magnesium and zinc oxide), metal carbonates (inter alia lithium, sodium, potassium, calcium, magnesium, zinc, manganese and iron (II) carbonate), metal salts of weak acids having pks values of greater than 2 (metal salts, preferably alkali metal salts inter alia of carboxylic acids, polycarboxylic acids, hydroxy carboxylic acids, amino carboxylic acids, phenols, diphenols, polyphenols, boric acid, carbonic acid, nitrous acid, phosphoric acid, pyrophosphoric acid, polyphosphoric acid, metaphosphoric acid, silicic acid and sulfurous acid), amines (inter alia ammonia, hydroxyl amine, monoalkyl amines, dialkyl amines, trialkyl amines, aryl amines, alkylene diamines, polyalkylene polyamines, arylene diamines, alkyl aryl amines, hydroxy alkyl amines, amino carboxylic acid derivatives and amino phenols), hydrazines (hydrazine hydrate, ketazines, such as isopropylidene ketazine or isobutylidene ketazine, hydrazobenzene and pyrazolidines), monomeric and polymeric quaternary ammonium hydroxides, and also other monovalent or polyvalent aliphatic or aromatic, open-chain or cyclic, saturated or unsaturated, optionally substituted nitrogen-containing bases (inter alia derivatives of pyrrole, pyrrolidine, pyrazole, pyrazolidone, pyrazoline, imidazole, imidazoline, imidazolidine, 1,2,3-triazole, 1,2,4-triazole, pyridine, pyridazine, pyrimidine, pyrazine, piperazine, 1,2,4-triazine, tetrazoles, indole, quinoline, isoquinoline, carbazole, acridine, phenanthridine, indazole, benzimidazole, quinoline, quinazoline, quinoxaline, phenazine, phenazone, phenanthroline, purine, oxazole, isoxazole, isothiazole, thiadiazole, benzoxazole, phenoxazine, morpholine, 1,4-thiazine, phenothiazine, triazine and melamine) and their salts with weak acids (inter alia ammonium carbonate, ammonium carbaminate and guanidinium carbonate).

The 1-substituted propane-1,3-diphosphonic acids and phosphinic acids produced in the manner described above and their salts are eminently suitable for conditioning aqueous solutions and suspensions, especially industrial water and aqueous sludges. Surprisingly, they are far superior as corrosion inhibitors to the propane-1,3-diphosphonic acid previously recognized as highly active in preventing the corrosion of iron (L. Horner, D. Schodel, Werkstoffe und Korrosion, 25, 711–720 (1974) and also to other alkane disphosphonic acids (U.S. Pat. No. 3,297,578) and also to the known 2-substituted propane-1,3-diphosphonic acids (U.S. Pat. No. 3,743,688). Their lime-binding capacity is also considerably greater than that of the known 1,3-dicarboxy propane-1-phosphonic acids. Finally,, they are distinguished from oligocarboxy phosphonic acids by increased thermal stability. In addition to their corrosion-inhibiting effect on metals and metal alloys, for example copper, aluminum and copper alloys, but especially iron and iron-containing alloys in aqueous systems, the 1-substituted propane-1,3-diphosphonic acids and phosphinic acids and their salts are able, even in substoichiometric quantities, to retard or completely prevent the formation of deposits, crystal growth and the growth of undesirable precipitations and, hence, concretions and encrustations in general, and also to disperse deposits and other solids and to fluidify sludges, slips and other ceramic masses. They are also suitable, for example, as additives in washing and cleaning agents.

Accordingly, the present invention also relates essentially to the use of the 1-substituted propane-1,3-diphosphonic acids and phosphinic acids and their salts as corrosion inhibitors, sequestrants, dispersants, concretion and encrustation inhibitors, precipitation retarders, deflocculants in aqueous solutions and suspensions, and as fluidifiers for sludges and slips, primarily for those of mineral origin, in aqueous media and also as auxiliaries in pigment suspensions.

In addition, to the greater activity of the 1-substituted propane-1,3-diphosphonic acids and phosphinic acids according to the invention by comparison with the phosphonic acids already proposed for the conditioning of industrial water, hydrolytic stability, even at elevated temperature, and the smaller quantity of phosphorus discharged into any effluent which accumulates are further advantages of the 1-substituted propane-1,3-diphosphonic acids and phosphinic acids according to the invention over the polyphosphates which at the present time are still the most frequently used for this purpose.

Examples of substances which can be influenced in their precipitation behavior in aqueous solution by the 1-substituted propane-1,3-diphosphonic acids according to the invention are carbonates of the alkaline earth metals magnesium, calcium, strontium and barium, sulfates of the alkaline earth metals, magnesium oxide, and also substantially insoluble salts and oxides or oxide hydrates of the other metal ions, present in the aqueous system in question, of iron, aluminum, chromium, tin, copper, nickel, cobalt, zinc, vanadium, etc.

The corrosion-inhibiting effect may be used in a plurality of aqueous systems which are used, for example, for dissipating or supplying heat or in which water of high purity of obtained from salt-containing water which may optionally contain organic constituents. Examples of systems such as these are water-cooled installations with fresh water cooling, with effluent cooling, with open or closed back cooling, and dry cooling towers which may be operated with prepurified or even with unpurified surface water from seas, lakes and rivers or with spring water. Installations for the production of substantially salt-free water may use salt-containing sea water, brackish water or river water as starting material and may function, for example, in accordance with the principles of evaporation, electrodialysis or reverse osmosis.

The 1-substituted propane-1,3-diphosphonic acids and phosphinic acids according to the invention are effective as corrosion inhibitors and concretion inhibitors at temperatures of from about $-50°$ C. in water of high salt content up to tempertures of about $250°$ C. in aqueous systems which are under pressure.

Although the need to prevent concretion predominantly occurs in substantially neutral to alkaline media, the activity range of the 1-substituted propane-1,3-diphosphonic acids and phosphinic acids according to the invention and their salts is further extended so that they may be used both in acid and also in alkaline aqueous medium, albeit preferably at pH-values of from about 7 to about 10.

To develop the favorable effect of the compounds according to the invention, it is advisable to add from about 0.05 to 5000 ppm to the aqueous medium to be treated, the concentrations preferred for concretion and encrustation prevention amounting to from about 0.05 to 20 ppm, for corrosion prevention to from about 5 to 500 ppm and for the fluidification of slips to from about 500 to 5000 ppm, depending upon the principal effect required and upon the main application involved. In order to maintain the particular concentration of active substance required, the 1-substituted propane-1,3-diphosphonic acids or phosphinic acids, or their salts or solutions thereof, may be added to the medium to be treated either in portiions or continuously.

The use of the 1-substituted propane-1,3-diphosphonic aids as corrosion inhibitors, precipitation inhibitors, sequestrants, fluidifiers and dispersants may also be carried out in combination with other known agents which are suitable for the particular application envisaged, such as for example amino polyphosphonic acids (inter alia 1-amino ethane-1,1-diphosphonic acid, amino acetic acid-N,N-bis-methylene phosphonic acid, nitrilo-tris-methylene phosphonic acid, ethylene diamine tetramethylene phosphonic acid, hexamethylene diamine-tetrakis-methylene phosphonic acid, tetramethylene triamine-pentakis-methylene phosphonic cid, dimethyl amino methane diphosphonic acid, N-methyl pyrrolidone-5,5-diphosphonic acid and other cyclic amino phosphonic acids), carboxy phosphonic acids (inter alia phosphonosuccinic acid, 1-methyl-1-phosphonosuccinic acid, 2-phosphonobutane-1,2,4-tricarboxylic acid, 1,3,5-tricarboxy pentane-3-phosphonic acid, 1-phosphonopropane-1,2,3-tricarboxylic acid, 1-phosphonobutane-2,3,4-tricarboxylic acid, 1,1-diphosphonopropane-2,3-dicarboxylic acid, 3-phosphonobutane-1,2,3-tricarboxylic acid, 3,3-diphosphono-butane-1,2-dicarboxylic aicd, and others of which some are mentioned in German DOS No. 2,360,797 or in German DOS No. 2,333,151), polyphosphonic acids (alkane-1,1-diphosphonic acids, ethane-1,2-diphosphonic acid, propane-1,3-diphosphonic acid, butane-1,4-diphosphonic acid, polyvinyl phosphonic acid etc.), polycarboxylic acids (polyacrylic acid, polymaleic acid, polyitaconic acid and copolymers thereof, hydroxy diacetic acid, poly-α-hydroxy acrylic acid and polyacrylamine), carbonyl diphosphonic acid, chloroalkane phosphonic acids (dichloromethane diphosphonic acid, 1-chloro-1-phenyl methane diphosphonic acid, etc.), hydroxy alkyl phosphonic acids (1-hydroxy ethane-1,1-diphosphonic acid, 1,2-dihydroxy ethane-1,1-diphosphonic acid, 2-amino-1-hydroxy ethane-1,1-diphosphonic acid and other phosphonic acids, for example of the type described in U.S. Pat. No. 3,714,006), polyols (glycerol, trimethylol propane, mannitol, polyethylene glycol, polypropylene glycol, ethylene glycol, carbohydrates, polyvinyl alcohol and vinyl alcohol copolymers), polyphosphate, orthophosphate, diphosphate, zinc, iron (II) ions, manganese (II) ions, chormat, silicate, sulfite ions, organic azoles (benzotriazole, mercaptobenzothiazole and other which have already been mentioned in reference to the nitrogen-containing bases suitable for neutralization), sulfonates (lignin sulfonate, tannin sulfonates, sulfonated aromatic compounds and sulfuric acid esters) and also with the additives normally use for the particular application in question, such as wetting agents, emulsifiers, foam inhibitors, foam stabilizers, bleaching agents, biocides, builders, dyes and complex formers, etc.

The invention is illustrated by the following Examples:

Example 1

100 g of 1,3-diphosphonobutane-3,4-dicarboxylic acid tetramethyl diethyl ester are mixed with 10 g of water and the resulting mixture is heated to 130° C. At this temperature, water is added dropwise at the same rate at which it distils off together with methanol and ethanol. After 16 hours at 130° C., only pure water distils off and hydrolysis is complete. Removal of the remaining water by distillation in vacuo leaves 1,3-diphosphonbutane-3,4-dicarboxylic acid in the form of a colorless glass-like mass which is dissolved in water in the interests of better handling.

Titration with sodium hydroxide gives an equivalent weight of 150 (theoretical 153) for the acid group ($pK_3 < 3$). The quantity of the medium-strength acids is twice as large as that of the strong acids. The sequestering effect on calcium carbonate is expressed by the softening factor. The softening factor is the nuber of ml of a 0.0155% calcium chloride solution consumed by 100 ml of soda-containing 1% solution of the acitve substance, in this case 1,3-diphosphonobutane-3,4-dicarboxylic acid, kept at pH 13, before hazing occurs.

The 1,3-diphosphonobutane-3,4-dicarboxylic acid has a softening factor of 240.

The so-called "Hampshire Test" produces a value of 420 mg of CaO/g for the sequestering capacity with respect to calcium.

EXAMPLE 2

105 g of 1,3-diphosphonobutane-3,4-dicarboxylic acid tetramethyl diethyl ester are mixed with 160 g of 36% hydrochloric acid and the resulting mixture is kept at 105° C. for 30 hours. During this period water distilling off in addition of methyl chloride, methanol and ethanol is replaced. Water and hydrochloric acid are then distilled off at 100° C./2 Torr and the residue is dried in vacuo for 2 days over NaOH pellets. According to the NMR-spectrum in dilute aqueous solution, 4 mole % of the phosphonic acid methyl ester and phosphonic acid ethyl ester groups have remained unhydrolyzed. The content amounts to less than 0.5%.

EXAMPLE 3

250 ml of 36% hydrochloric acid are added to 97 g of 1,3-diphosphonopropane-1-carboxylic acid pentaethyl ester, after which the mixture is kept in 110°–115° C. for 20 hous. After 8 hours at that temperature, 10 ml/h of water are added over the next 12 hours. Water and hycrocholoric acid are then distilled off in vacuo at 120° C./2 Torr and the solid residue is dried for 2 days in vacuo over KOH pellets in order to remove the adhering hydrogen chloride. Yield: 63 g.

No more ethoxy groups can be detected by NMR-spectroscopy. Taking only the strongly acid groups into account, alkalimetric titration gives an equivalent weight of 120 (theoretical 124).

The final softening factor determined in the manner described in Example 1 amounts to 101. According to the Hampshire Test, the sequestering capacity with respect to calcium amounts to 190 mg of CaO/g.

EXAMPLE 4

Thermal stability of 1-carboxy propane-1,3-diphosphonic acid:
- Solution A: 1 g of 2-phosphonobutane-1,2,4-tricarboxylic acid/kg, pH 10.0
- Solution B: 1 g of 1-carboxy propane diphosphonic acid/kg, pH adjusted to 10.0 by the addition of sodium hydroxide.

Quantities of 80 ml of these solutions were introduced into test tube autoclaves and stored in a drying cabinet for 24 hours at 200° C. and 240° C. The decomposition of the phosphonic acids was followed by determination of the o-phosphate content.

| Temperature | 200° C. | | 240° C. |
|---|---|---|---|
| Starting solution | A | B | B |
| ppm of $PO_4$-ortho after 24 hours | 332 | 147 | 218 |
| decomposition in % after 24 hours | 87.5 | 24.9 | 36.9 |

EXAMPLE 5

Dispersing effect of 1-carboxy propane-1,3-diphosphonic acid on iron hydroxide:

5 ml of $FeCl_3$ solution (5 g of $FeCl_3$/100 ml) and 10 ml of $Na_2CO_3$-solution (10 g of $Na_2CO_3$/100 ml) were successively added while stirring to 1000 ml of fully desalted water in a two-liter glass beaker containing the particular test substance. The mixtures were then immediately transferred to an Imhoff sedimentation vessel and the height of the $Fe(OH)_3$-deposit formed was read off at different intervals.

The results are shown in the following table:

| | | Minutes | | | | | | | | | | | | | | hours | | |
|---|---|---|---|---|---|---|---|---|---|---|---|---|---|---|---|---|---|---|
| | | 10 | 20 | 30 | 40 | 50 | 60 | 70 | 80 | 90 | 100 | 110 | 120 | 150 | 180 | 5 | 6 | 24 |
| No addition | | 1 | 10 | 60 | 60 | 58 | 56 | 55 | 54 | 53 | 52 | 51 | 50 | 50 | 50 | — | — | 30 |
| A | 1 ppm | 0 | 0 | 0 | 0 | 0 | 0 | 0 | 0 | 0.5 | 10 | 40 | 52 | 40 | 38 | 31 | 30 | 21 |
| | 5 ppm | 0 | 0 | 0 | 0 | 0 | 0 | 0 | 0 | 0 | 0 | 0 | 0 | 0 | 0 | 26 | 24 | 15 |
| | 10 ppm | 0 | 0 | 0 | 0 | 0 | 0 | 0 | 0 | 0 | 0 | 0 | 0 | 0 | 0 | 0 | 0 | 3 |
| | 30 ppm | 0 | 0 | 0 | 0 | 0 | 0 | 0 | 0 | 0 | 0 | 0 | 0 | 0 | 0 | 0 | 0 | 0 |
| C | 5 ppm | 1 | 17 | 50 | 52 | 50 | 50 | 50 | 50 | 50 | 50 | 48 | 46 | 46 | 45 | — | — | 25 |
| | 10 ppm | 0 | 0 | 2 | 20 | 55 | 54 | 54 | 54 | 53 | 52 | 52 | 51 | 50 | 49 | — | — | 30 |
| | 30 ppm | 0 | 0 | 0 | 0 | 0 | 0 | 0 | 0 | 0 | 0 | 0 | 0 | 0 | 0 | 0 | 0 | 6 |
| D | 5 ppm | 0 | 0 | 8 | 80 | 68 | 62 | 60 | 56 | 55 | 54 | 52 | 52 | 52 | 52 | | | |
| | 10 ppm | 0 | 0 | 0 | 0.2 | 0.8 | 3 | 35 | 36 | 35 | 34 | 33 | 32 | 30 | 30 | | | |
| | 30 ppm | 0 | 0 | 0 | 0 | 0 | 0 | 0 | 0 | 0 | 0 | 0 | 0 | 0 | 0 | 0 | 0 | 0 |

The figures denote the quantity of iron hydroxide deposit in ml
A = 1-carboxypropane-1,3-diphosphonic acid
C = 2-phosphonobutane-1,2,4-tricarboxylic acid (comparison)
D = polyacrylic acid (Polystabil S 170 ®, a product of Stockhausen) (comparison)

EXAMPLE 6

Threshold effect of 1-carboxy propane-1,3-diphosphonic acid in the stabilization of calciium phosphate:

5 ml of $CaCl_2$ solution (1 ml=10 ml of CaO) and 5 ml of 10% $Na_3PO_4 . 12 H_2O$ solution were successively added while stirring to 1000 ml of fully desalted water in a 2-liter glass beaker containing the particular test substance. The mixtures were then immediately transferred to an Imhoff sedimentation essel and the height in ml of the $Ca_3(PO_4)_2$ deposit formed was read off at different intervals.

The results are shown in the following table:

|  |  | \multicolumn{14}{c}{Minutes} | \multicolumn{3}{c}{Hours} |
|---|---|---|---|---|---|---|---|---|---|---|---|---|---|---|---|---|---|
|  |  | 10 | 20 | 30 | 40 | 50 | 60 | 70 | 80 | 90 | 100 | 110 | 120 | 150 | 180 | 5 | 6 | 24 |
| no addition |  | 25 | 37 | 36 | 35 | 34 | 34 | 34 | 33 | 32 | 32 | 31 | 31 | 29 | 29 | 27 | 25 | 17 |
|  | 1 ppm | 0 | 27 | 32 | 31 | 30 | 30 | 29 | 29 | 29 | 27 | 27 | 27 | 25 | 25 | 25 | 22 | 13 |
|  | 5 ppm | 0 | 0 | 0 | 0 | 0 | 0 | 0.2 | 0.2 | 0.2 | 1 | 3 | 5 | 13 | 22 | 22 | 19 | 15 |
| A | 10 ppm | 0 | 0 | 0 | 0 | 0 | 0 | 0 | 0 | 0 | 0 | 0 | 0 | 0 | 0 | 0 | 7 | 16 |
|  | 30 ppm | 0 | 0 | 0 | 0 | 0 | 0 | 0 | 0 | 0 | 0 | 0 | 0 | 0 | 0 | 0 | 0 | 0 |
|  | 1 ppm | 12 | 48 | 46 | 44 | 42 | 40 | 39 | 39 | 38 | 38 | 37 | 35 | 33 | 33 | 26 | 23 | 13 |
|  | 5 ppm | 4 | 37 | 38 | 38 | 37 | 36 | 35 | 35 | 34 | 34 | 33 | 33 | 33 | 33 | 30 | 28 | 15 |
| D | 10 ppm | 0 | 0 | 0 | 0 | 0 | 0 | 0 | 0 | 0 | 0 | 0 | 0 | 0 | 0 | 0 | 12 | 9 |
|  | 30 ppm | 0 | 0 | 0 | 0 | 0 | 0 | 0 | 0 | 0 | 0 | 0 | 0 | 0 | 0 | 0 | 0 | 0 |
|  | 1 ppm | 0 | 13 | 25 | 30 | 30 | 30 | 30 | 29 | 28 | 28 | 28 | 28 | 28 | 27 | 24 | 22 | 13 |
|  | 5 ppm | 0 | 18 | 27 | 30 | 30 | 30 | 30 | 30 | 30 | 30 | 30 | 30 | 28 | 28 | 25 | 23 | 13 |
| E | 10 ppm | 0 | 25 | 30 | 33 | 32 | 32 | 32 | 30 | 30 | 30 | 30 | 30 | 29 | 28 | 25 | 23 | 13 |
|  | 30 ppm | 0 | 46 | 44 | 40 | 40 | 40 | 38 | 38 | 38 | 38 | 37 | 36 | 34 | 32 | 27 | 23 | 13 |

A and D as in Example 5
E = propane-1,3-diphosphonic acid

EXAMPLE 7

Threshold effect of 1-carboxy propane-1,3-diphosphonic acid in the stabilization of calcium carbonate:

The quantities of soda stoichiometrically required for the formation of $CaCO_3$ were added with stirring to $CaCl_2$-solutions of 5° and 30° dH(dH=deutsche Haerte=German Hardness) and with inhibitor concentrations of 1, 10 and 25 ppm. After standing for 24 hours in a 500 ml Erlenmeyer flask, the hardness remaining in solution was determined after filtration through membrane filters with Titriplex B.

The following table shows the calcium remaining in solution as precentage of the initial concentration

| Starting solution |  | \multicolumn{3}{c}{5° Ger. hardness} |  |  | \multicolumn{3}{c}{30° Ger, hardness} |
|---|---|---|---|---|---|---|---|---|---|
| Temperature |  | \multicolumn{3}{c}{20° C.} | \multicolumn{3}{c}{70° C.} | \multicolumn{3}{c}{20° C.} |
| Inhibitor concentration ppm |  | 1 | 10 | 25 | 1 | 10 | 25 | 1 | 10 | 25 |
|  |  | \multicolumn{9}{c}{% Ca in solution} |
|  | A | 100 | 100 | 97 | 40 | 82 | 72 | 2 | 25 | 20 |
|  | D | 100 | 100 | 100 | 20 | 86 | 100 | 2 | 15 | 29 |

(A and D as in Example 5)

EXAMPLE 8

Influencing concretion at 70° C.

An HCl-pickled immersion heater was suspended in a 5 liter glass beaker filled with Leverkusen tap water and the water was subsequently heated for 12 hours to 70° C. On termination of the test, the immersion heater was again pickled with HCl and the calcium present in the pickling solution was determined as a measure of the coating formed.

Analytical data of the tap water:
total hardness: 15° d
carbonate hardness: 10° d
chloride: 190 mg/kg
sulfate ($SO_4$): 100 mg/kg
total ions: 770 mg/kg

| Input of product, 100% | ppm | mg of Ca/ immersion heater | Remarks |
|---|---|---|---|
| tap water, no addition |  | 43.2 | clouding after 12h |
| C | 0.5 | 2.13 | slight clouding after 12h |
|  | 2.5 | 0.66 | clear solution after 12h |
| A | 0.5 | 9.4 | some clouding after 12h |
|  | 2.5 | 1.24 | some clouding after 12h |

A and C as in Example 5

EXAMPLE 9

Influencing concretion at 70° C. in seawater.

an HCl-pickled immersion heater was suspended in a 5 liter glass beaker filled with artificial seawater according to DIN 50900 and the water was subsequently heated for 12 hours to 70° C. On termination of the test, the immersion heater was again pickled with HCl and the calcium present in the pickling solution was determined as a measure of the coating formed.

| Input of product, 100% | ppm | mg of Ca/ immersion heater | Remarks |
|---|---|---|---|
| Artificial seawater no addition |  | 100 | after 12 h, heavy clouding coarse-flake precipitation |
| A | 0.5 | 8.3 | some clouding |
|  | 2.5 | 7.4 | heavy clouding |
| C | 0.5 | 14.9 | slight clouding after 12 h |
|  | 2.5 | 9.6 | slight clouding after 12 h |
| D | 5 | 98 | colloidal clouding |
|  | 25 | 13.4 | colloidal clouding |

A, C, D as in Example 5

EXAMPLE 10

Corrosion inhibition of St 35 carbon steel.

4 HCl-pickled steel tube rings of St 35 were each attached to a plastic stirrer and stirred around in Leverkusen tapwater at ambient temperature at a speed of 0.6 m/s. The concentration of active substance amounted to 50, 100 and 300 ppm, respectively.

Analytical data of the water:
total hardness: 15° d
carbonate hardness: 10° d
chloride: 190 mg/kg
sulfate ($SO_4$): 100 mg/kg
total ions: 770 mg/kg After 4 days under test, the tube rings were again pickled and the weight was determined. During the test, the pH-value was adjusted to about 7 with $H_2SO_4$.

| Input ppm | | Corrosion rate g/m² . d |
|---|---|---|
| no addition | | 21.06 |
| | 50 | 0.59 |
| A | 100 | 0.57 |
| | 300 | 1.82 |
| | 50 | 2.26 |
| C | 100 | 1.60 |
| | 300 | 5.84 |
| | 50 | 2.37 |
| F | 100 | 1.94 |
| | 300 | 6.24 |

A and C as in Example 5
F = polycarboxylic acid (Belgard EV$^{(R)}$, a product of Ciba-Geigy)

EXAMPLE 11

Corrosion inhibition of St 35 carbon steel.

4 HCl-pickled steel rings of St 35 were each attached to a plastic stirrer and stirred around in Leverkusen tapwater at ambient temperature at a speed of 0.6 m/s. The concentration of active substance amounted to 10, 25 and 50 ppm, respectively.

Analytical data of the water:
  total hardness: 15° d
  carbonate hardness: 10° d
  chloride: 190 mg/kg
  sulfate (SO$_4$): 100 mg/kg
  total ions: 770 mg/kg After 4 days under test, the tube rings were again pickled and the weight loss and determined. During the test, the pH-value was adjusted to about 7 with H$_2$SO$_4$.

Meaning of the inhibitor symbols:
A, C as in Example 5
B = 1,2-dicarboxy butane-2,4-diphosphonic acid
G = 1-phosphonopropane-3,3-dicarboxylic acid
H = 2-methylpropane-1,3-diphosphonic acid
J = ethane-1,2-diphosphonic acid
K = 3,3-dicarboxypentane-1,5-diphosphonic acid Results:

| Inhibitor | Concentration ppm | Corrosion rate g/cm² . d ≙ mm per year | |
|---|---|---|---|
| no addition | | 21.06 | ≙ 1.04 |
| | 10 | 9.45 | ≙ 0.47 |
| A | 25 | 1.34 | ≙ 0.07 |
| | 50 | 0.59 | ≙ 0.03 |
| | 10 | 2.80 | ≙ 0.14 |
| B | 25 | 1.12 | ≙ 0.06 |
| | 50 | 0.98 | ≙ 0.05 |
| | 10 | 13.06 | ≙ 0.64 |
| C | 25 | 1.89 | ≙ 0.09 |
| | 50 | 2.26 | ≙ 0.11 |
| | 10 | 16.59 | ≙ 0.82 |
| G | 25 | 12.64 | ≙ 0.62 |
| | 50 | 6.77 | ≙ 0.33 |
| | 10 | 11.19 | ≙ 0.55 |
| H | 25 | 1.38 | ≙ 0.07 |
| | 50 | 1.56 | ≙ 0.08 |
| | 10 | 13.98 | ≙ 0.69 |
| J | 25 | 1.48 | ≙ 0.07 |
| | 50 | 1.27 | ≙ 0.06 |
| | 10 | 15.27 | = 0.75 |
| K | 25 | 11.95 | = 0.59 |
| | 50 | 3.16 | = 0.16 |

EXAMPLE 12

Corrosion inhibition of St 35 carbon steel.
Test procedure as in Example 11.
(Meaning of A,C as in Example 11).

| Input (ppm) | | | Corrosion rate | |
|---|---|---|---|---|
| C | A | L | g/m² . d ≙ mm per year | |
| no addition | | | 21.06 | ≙ 1.04 |
| 10 | | | 13.06 | ≙ 0.64 |
| 25 | | | 1.89 | ≙ 0.09 |
| 50 | | | 2.26 | ≙ 0.11 |
| 10 | | 1 | 12.62 | ≙ 0.62 |
| | 10 | | 9.45 | ≙ 0.47 |
| | 25 | | 1.34 | ≙ 0.07 |
| | 50 | | 0.59 | ≙ 0.03 |
| 5 | 5 | | 10.12 | ≙ 0.50 |
| 5 | 5 | 1 | 3.09 | ≙ 0.15 |
| 10 | 10 | 1 | 1.40 | ≙ 0.07 |
| 10 | 2 | 1 | 4.17 | ≙ 0.21 |
| 10 | 5 | | 2.08 | ≙ 0.10 |
| 25 | 25 | | 0.99 | ≙ 0.05 |
| 10 | 5 | 2 | 1.04 | ≙ 0.05 |

L = 2-(ε-aminopentyl)-benzimidazole

Example 13

Corrosion inhibition of St 35 carbon steel by combinations of 1-carboxypropane-1,3-diphosphonic acid and 2-phosphonobutane-1,2,4-tricarboxylic acid.
Test procedure as in Example 11.
(Meaning of A, C and L as in Examples 11 and 12).

| Inhibitor | Concentration (ppm) | Corrosion rate g/m² . d ≙ mm per year | |
|---|---|---|---|
| no addition | | 21.06 | ≙ 1.04 |
| C | 10 | 13.06 | ≙ 0.64 |
| A | 10 | 9.45 | ≙ 0.47 |
| C | 5 | 10.12 | ≙ 0.50 |
| A | 5 | | |
| C | 10 | 1.48 | ≙ 0.07 |
| A | 10 | | |
| C | 10 | 2.08 | ≙ 0.10 |
| A | 5 | | |
| C | 5 | | |
| A | 5 | 3.08 | ≙ 0.15 |
| L | 1 | | |
| C | 10 | | |
| A | 10 | 1.40 | ≙ 0.07 |
| L | 1 | | |

EXAMPLE 14

Corrosion inhibition of St 35 carbon steel by combinations of 1,2-dicarboxybutane-2,4-diphosphonic acid and 2-phosphonobutane-1,2,4-tricarboxylic acid.
Test procedure as in Example 11.
(Meaning of B, C and L as in Examples 11 and 12).

| Inhibitor | Concentration (ppm) | Corrosion rate g/m² . d ≙ mm per year | |
|---|---|---|---|
| no additon | | 21.06 | ≙ 1.04 |
| C | 10 | 13.06 | ≙ 0.64 |
| B | 10 | 2.80 | ≙ 0.14 |
| C | 5 | 4.14 | ≙ 0.20 |
| B | 5 | | |
| C | 10 | 2.40 | ≙ 0.12 |
| B | 10 | | |
| C | 10 | 2.85 | ≙ 0.14 |
| B | 5 | | |
| C | 5 | | |
| B | 5 | 4.17 | ≙ 0.21 |
| L | 1 | | |
| C | 10 | | |
| B | 10 | 2.34 | ≙ 0.12 |
| | 1 | | |

EXAMPLE 15

Synergism in the corrosion inhibition of St 35 carbon steel.

Test procedure as in Example 11.
(Meaning of B,C, L as in Examples 11 and 12).

| Inhibitor | Concentration (ppm) | Corrosion rate $g/m^2 \cdot d$ = mm per year |
|---|---|---|
| no addition | | 21.06 = 1.04 |
| Mixture H | 20 | 2.55 = 0.13 |

The mixture has the following composition:
20% C
10% B
10% phosphoric acid
5% zinc (as zinc oxide)
5% L
50% water

EXAMPLE 16

Corrosion inhibition of CuNi 10 Fe and CuNi 30 Fe in seawater.

Two test specimens of each of the materials CuNi 10 Fe and CuNi 30 Fe were boiled for 24 days in artificial seawater according to DIN No. 50900 containing additions of 5 and 25 ppm of A, C and F (meaning as in Example 10). In each case, the solutions were changed after 6 days.

The pH-value of all the solutions was determined before and after each test period.

In these tests, the specimens were only cleaned after testing to such an extent that any oxide coatings formed (passive layers) remained on the specimens.

By virtue of this step, the aggressiveness of the additions on already attacked surfaces was included in the investigation. On completion of the tests, linear corrosion rate (mm/year) were obtained over all periods, as shown in the following Table:

| Solution | CuNi 10 Fe | CuNi 30 Fe |
|---|---|---|
| Seawater | 0.002 mm/year | 0 |
| +5 ppm C | 0.006 | 0.002 |
| +5 ppm A | 0.003 | <0.001 |
| +5 ppm F | 0.009 | 0.005 |
| +25 ppm C | 0.005 | 0.002 |
| +25 ppm A | 0.007 | 0.003 |
| +25 ppm F | 0.012 | 0.008 |

The following Table shows the changes in weight (in g) of the test specimens over the four test periods:

| Solution | | | | |
|---|---|---|---|---|
| Material CuNi 10 Fe | | | | |
| Seawater | −0.0005 | −0.0004 | −0.0001 | −0.0001 |
| +5 ppm C | −0.0019 | +0.0018 | −0.0029 | −0.0012 |
| +5 ppm A | −0.0026 | +0.0024 | −0.0015 | −0.0003 |
| +5 ppm F | −0.0033 | +0.0002 | −0.0021 | −0.0006 |
| +25 ppm C | −0.0026 | +0.0010 | −0.0014 | −0.0003 |
| +25 ppm A | −0.0030 | +0.0002 | −0.0010 | −0.0003 |
| +25 ppm F | 0.0042 | −0.0020 | −0.0009 | −0.0003 |
| Material CuNi 30 Fe | | | | |
| Seawater | 0.0004 | 0.0006 | 0.0007 | 0.0008 |
| +5 ppm C | 0.0012 | +0.0009 | 0.0006 | 0.0004 |
| +5 ppm A | 0.0018 | +0.0027 | 0.0007 | 0.0006 |
| +5 ppm F | 0.0022 | +0.0005 | 0.0009 | 0.0008 |
| +25 ppm C | 0.0018 | +0.0014 | 0.0005 | 0.0003 |
| +25 ppm A | 0.0024 | +0.0016 | 0.0006 | 0.0005 |
| +25 ppm F | 0.0044 | +0.0005 | 0.0002 | 0.0008 |

The test results show that, although the additions of A, C and F increase the surface-related weight loss in relation to seawater without any additions, the erosion rates are nevertheless so small as still to be acceptable.

1-Carboxypropane-1,3-diphosphonic acid is distinguished by rapid protective-layer formation and minimal corrosiveness. This minimal corrosiveness with respect to the above-mentioned materials is of considerable advantage for the use of this acid as a sequestrant and dispersant in installations operated with seawater.

EXAMPLE 17

Fluidifiers a-c were added to a mixture of 400 g of Kaerlicher Blauton (blue clay), which is a particularly difficult clay to fluidify, and 400 g of water.

(a) 25% aqueous solution of amino-tris-methylene phosphonic acid, $Na_5$-salt, and $Na_2SiO_3.9H_2O$, ratio by weight 1:7 (according to German DAS No. 1,542,202)

(b) 25% aqueous solution of 1-hydroxyethane-1,1-diphosphonic acid, $Na_4$-salt, and $Na_2SiO_3.9H_2O$, ratio by weight 1:7 (according to German DAS No. 1,154,028) (c) 25% aqueous solution of 1,3-diphosphonobutane-3,4-dicarboxylic acid, $Na_6$-salt and $Na_2SiO_3.9H_2O$, ratio by weight 1:7 (according to the invention).

The fluidifying effect was determined in a Lehmann viscosimeter, orifice diameter 3.2 mm, by measuring the flowout time of 100 ml. of dispersion after standing for 0.5, 10 and 20 minutes. Mixtures which did not form any troublesome skin on the surface of the dispersion during the measuring time of 20 minutes were investigated. The maximum addition was 15 mm of fluidifier.

The results obtained were as follows:

| Fluidifier | ml | Standing time (minutes) | Flowout time (seconds) |
|---|---|---|---|
| (a) | 11 | 0 | 15 |
| | | 5 | 25 |
| | | 10 | 34 |
| | | 20 | 73 |
| | 13 | 0 | 14 |
| | | 5 | 23 |
| | | 10 | 31 |
| | | 20 | 60 |
| | 15 | 0 | 14 |
| | | 5 | 22 |
| | | 10 | 28 |
| | | 20 | 41 |
| (b) | 15 | 0 | 14 |
| | | 5 | 22 |
| | | 10 | 36 |
| | | 20 | 68 |
| (c) | 8 | 0 | 15 |
| | | 5 | 24 |
| | | 10 | 31 |
| | | 20 | 60 |
| | 10 | 0 | 14 |
| | | 5 | 28 |
| | | 10 | 28 |
| | | 20 | 40 |

It will be appreciated that the instant specification and examples are set forth by way of illustration and not limitation, and that various modifications and changes may be made without departing from the spirit and scope of the present invention.

What we claim is:

1. In the conditioning of water by adding thereto an amount of a phosphorus containing acid or salt thereof effective to inhibit precipitation of hard water ions contained therein, the improvement which comprises employing as said acid or salt thereof a 1-substituted propane-1,3-diphosphonic acid of the formula

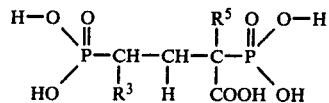

in which
R³ represents hydrogen, or a carboxy group, and
R⁵ represents hydrogen, a carboxymethyl or carboxyethyl group,
or a salt thereof.

2. The process according to claim 1, wherein the diphosphonic acid is 1,3-diphosphonobutane-3,4-dicarboxylic acid.

3. The process according to claim 1, wherein the diphosphonic acid is 1-carboxypropane-1,3-diphosphonic acid.

* * * * *